United States Patent
Sun et al.

(10) Patent No.: US 10,639,877 B2
(45) Date of Patent: May 5, 2020

(54) THREE-DIMENSIONAL PRINTING SYSTEMS FOR RAPIDLY PRODUCING OBJECTS

(71) Applicant: DENTSPLY SIRONA Inc., York, PA (US)

(72) Inventors: Benjamin Jiemin Sun, York, PA (US); Jessica Jiaxin Sun, York, PA (US)

(73) Assignee: DENTSPLY SIRONA Inc., York, PA (US)

( * ) Notice: Subject to any disclaimer, the term of this patent is extended or adjusted under 35 U.S.C. 154(b) by 0 days.

(21) Appl. No.: 15/156,164

(22) Filed: May 16, 2016

(65) Prior Publication Data

US 2016/0332367 A1 Nov. 17, 2016

Related U.S. Application Data

(60) Provisional application No. 62/162,106, filed on May 15, 2015.

(51) Int. Cl.

| | |
|---|---|
| *B33Y 10/00* | (2015.01) |
| *C08F 20/12* | (2006.01) |
| *C08K 3/36* | (2006.01) |
| *C08K 3/22* | (2006.01) |
| *C08K 3/34* | (2006.01) |
| *C08L 33/08* | (2006.01) |
| *B33Y 30/00* | (2015.01) |
| *B29C 64/124* | (2017.01) |
| *B29C 64/20* | (2017.01) |
| *B29C 64/386* | (2017.01) |
| *B29C 64/135* | (2017.01) |
| *B29C 64/40* | (2017.01) |
| *B29K 105/16* | (2006.01) |
| *B33Y 50/02* | (2015.01) |
| *B33Y 70/00* | (2020.01) |
| *B33Y 80/00* | (2015.01) |
| *B29L 31/00* | (2006.01) |
| *B29C 64/129* | (2017.01) |

(52) U.S. Cl.
CPC ............ *B33Y 10/00* (2014.12); *B29C 64/124* (2017.08); *B29C 64/135* (2017.08); *B29C 64/20* (2017.08); *B29C 64/386* (2017.08); *B29C 64/40* (2017.08); *B33Y 30/00* (2014.12); *C08F 20/12* (2013.01); *C08K 3/22* (2013.01); *C08K 3/34* (2013.01); *C08K 3/36* (2013.01); *C08L 33/08* (2013.01); *B29C 64/129* (2017.08); *B29K 2105/16* (2013.01); *B29L 2031/7536* (2013.01); *B33Y 50/02* (2014.12); *B33Y 70/00* (2014.12); *B33Y 80/00* (2014.12); *C08K 2003/2227* (2013.01)

(58) Field of Classification Search
CPC ...... B33Y 10/00; B33Y 30/00; B29C 67/0066; B29C 67/0062
See application file for complete search history.

(56) References Cited

U.S. PATENT DOCUMENTS

| | | | | |
|---|---|---|---|---|
| 5,182,715 A | * | 1/1993 | Vorgitch | G06F 17/246 264/401 |
| 5,474,719 A | * | 12/1995 | Fan | B29C 41/12 156/273.3 |
| 2009/0023085 A1 | * | 1/2009 | Tsuchimura | G03F 7/0007 430/7 |
| 2016/0046075 A1 | * | 2/2016 | DeSimone | B33Y 30/00 264/401 |

FOREIGN PATENT DOCUMENTS

| | | |
|---|---|---|
| DE | 102013102377 A1 | 9/2014 |
| WO | 20120021940 A1 | 2/2012 |
| WO | 20130026087 A1 | 2/2013 |

OTHER PUBLICATIONS

International Search Report; PCT/US2016/032776; Aug. 26, 2016 (completed); Sep. 6, 2016 (mailed).
Written Opinion of the International Searching Authority; PCT/US2016/032776; Aug. 26, 2016 (completed); Sep. 6, 2016 (mailed).
International Preliminary Report on Patentability; PCT/US2016/032776; Aug. 26, 2016 (completed); Sep. 6, 2016 (mailed).

* cited by examiner

*Primary Examiner* — Jacob T Minskey
*Assistant Examiner* — Melody Tsui
(74) *Attorney, Agent, or Firm* — Dentsply Sirona Inc.

(57) ABSTRACT

This invention relates to rapid prototyping systems, specifically, a continuous moving surface liquid resin system (CMSL) and fast printing method for making any 3D objects, such as dental devices, including but not limited to artificial teeth, dentures, orthodontic appliances, aligners, splints, veneers, inlays, onlays, copings, frame patterns, crowns and bridges and the like. 3D printers, such as DLP or stereolithography printer, are used to cure polymerizable material in a layer-by-layer manner to build-up the object rapidly and continuously.

19 Claims, No Drawings

THREE-DIMENSIONAL PRINTING SYSTEMS FOR RAPIDLY PRODUCING OBJECTS

THE CROSS-REFERENCE TO RELATED APPLICATIONS

The This patent application claims the benefit of and priority to U.S. Provisional Patent Application Ser. No. 62/162,106, filed on May 15, 2015, which is herein incorporated by reference for all purposes.

TECHNICAL FIELD

The present invention relates generally to rapid prototyping systems, specifically, a continuous moving surface liquid resin system (CMSL) and fast printing method for making any 3D objects, such as dental devices, for example, artificial teeth, dentures, splints, veneers, inlays, onlays, orthodontic appliances, aligners, copings, frame patterns, crowns and bridges, models, appliances and the like. More particularly, using continuous light beam irradiation, such as stereolithography (SLA) or DLP (Digital Light Processor) to build-up any 3D objects or dental devices as three-dimensional objects from novel liquid resins of this invention. SLA using laser beam traces out the shape of each layer and hardens the photosensitive resin in a vat. The DLP system builds three-dimensional objects by using the Digital Light Processor (DLP) projector to project sequential voxel planes into liquid resin, which then caused the liquid resin to cure.

BACKGROUND

In general, rapid prototyping refers to a conventional manufacturing process used to make parts, wherein the part is built on a layer-by-layer basis using layers of hardening material. Per this technology, the part to be manufactured is considered a series of discrete cross-sectional regions which, when combined together, make-up a three-dimensional structure. The building-up of a part layer-by-layer is very different than conventional machining technologies, where metal or plastic pieces are cut and drilled to a desired shape. In rapid prototyping technology, the parts are produced directly from computer-aided design (CAD) or other digital images. Software is used to slice the digital image into thin cross-sectional layers. Then, the part is constructed by placing layers of plastic or other hardening material on top of each other. There are many different techniques that can be used to combine the layers of structural material. A curing step may be required to fully cure the layers of material.

One issue related to bottom up technique, such as employed in B9Creator from B9Creations, LLC, Form1 from Formlabs, etc., requires the separation of cured solid from the bottom clear window in a vat, which often showed to be difficult and required extra care and step. Irradiation is needed to stop to separate cured solid from the bottom clear window in a vat before next layer can be built.

SUMMARY OF THE INVENTION

In one aspect, the present invention is directed to a method for making a three-dimensional object comprising the steps of: loading a polymerizable liquid resin material or heated resin material as a liquid into a resin bath (vat) of a 3D printer; locating one or more mechanical arms at clear and/or transparent window proximate to the bottom of the resin bath to maintain a liquid interface between a build surface and the clear and/or transparent window proximate to the bottom of the resin bath; applying sequential voxel planes into the liquid resin or the heated resin to form a first layer of material, which polymerizes into a solid; and applying one or more successive layers of the polymerized material continuously until a predetermined shape is formed.

In another aspect of the present invention, it is contemplated that the high strength dental composition has one or any combination of the following features: the 3D printer is selected from the group consisting of a DLP based, stereolithography based and other light irradiation based 3D printer; the one or more mechanical arms are in a form selected from the group consisting of a thin wire, a thin knife, a thin disk, a thin half circle wire, and combinations thereof; the one or more mechanical arms are continuously moving during printing to maintain a thin liquid layer at ambient or elevated temperature on the clear and/or transparent window at the bottom of the resin bath; the thin liquid layer has a thickness of from about 0.02 mm to about 2 mm; the one or more mechanical arms have different cross-section shapes selected from the group consisting of a circle, triangle, square, wedge, rectangle, elliptical, diamond, and combinations thereof; the one or more mechanical arms enable the continuous flow of highly viscous materials on the clear and/or transparent window at the bottom of the resin bath; a shear strain from the one or more mechanical arms form a thin layer of flowable material at the bottom of the resin bath; the one or more mechanical arms is at least two mechanical arms; further comprising the step of utilizing a physical constraint form intimately above the one or more moveable mechanical arms, wherein the physical constraint form is in a shape selected from the group consisting of a tube, a ring, a diamond ring, a half-moon ring, a half cycle ring, an elliptical ring, a square ring, a rectangle ring and a combination thereof according to the predetermined need of the printed object and a shape of a building platform; the three-dimensional object is a dental prosthesis or dental device, selected from the group consisting of an artificial tooth, a denture, an orthodontic appliance, an aligner, a splint, a veneer, an inlay, an onlay, a coping, a frame pattern, a crown and a bridge; the liquid resin material or the heated resin material comprises at least a polymerizable material and polymerization initiation system capable of being activated by light; the resin material is heated to have a reduced viscosity or to achieve a sufficient flowable state; the polymerizable material comprises at least one of polymerizable acrylic oligomers, one or more prepolymers and one or more monomers; the polymerizable material further comprises a particulate filler; the particulate filler is selected from the group consisting of silica, alumina, silicon nitride, polymers, inorganic articulates, and glasses an combinations thereof; the polymerization initiation system comprises a photoactive agent, selected from the group consisting of camphorquinone, 2,4,6 trimethylbenzoyldiphenyl phosphine oxide, and a combination thereof; the polymerizable material further comprises one or more pigments; the polymerizable material further comprises one or more inhibitors; or any combination thereof.

DETAILED DESCRIPTION OF THE INVENTION

The present invention provides novel mechanism by mechanical actions (continuous moving surface liquid layer—CMSL) to limit the exposure time of a thin layer of resin on the bottom clear window and continuing printing systems for fabricating three-dimensional objects including dental devices using the Digital Light Processor (DLP) projectors or other light beam irradiations, such as stereolithography.

In this system, a specially designed vat having a special coated or uncoated mechanical arm(s)/moving part(s) intimately set on top of clear window (such as on a silicone film, a coated or uncoated window). This mechanical arm may also be surfaced treated, coated with polymerization inhibitors, or oxygen saturated. Special mechanical means may also be built into 3D printer to effectively clean the mechanical arm to remove/exchange the transit exposed liquid resin with fresh liquid resin. This arm contains specially designed razor sharp edge, which cut through the resin at the top surface of this arm (blade) while the resin underneath the sharp edge is rapidly swept out and replaced with fresh resin. This arm can be in a form of a thin wire, a thin knife, a thin disk, a thin half circle wire, and multiple-arm form, etc. or their combinations, and they can be in different cross-section shapes, such as circle, triangle, square, wedge, rectangle, elliptical, diamond, etc. and their combinations. This approach moves uncured resin "out of harm's way"—from pre-matured polymerization and separates the cured part from window. At the same time, this mechanical arm(s) also supplies additional resin for continuous cures to build up additional layers continuously. This mechanical arm has intimate contact to the clear window and is able to cleanly remove any liquid resin on the clear window without much residue. It also can separate the cured part from window while it is feeding uncured resin for next layer at the same time. The speed of arm can be adjusted based on curing rate, curing area, curing volume, moving of building platform, and the rheological behavior of resin system. The building platform can move continuously or stepwise according to the speed of mechanical arm, or resin systems. Resins used in 3D printing contain inhibitors and have a certain induction period. Induction period is the period which elapses between the time light irradiation is started and the actual onset of the polymerization reaction. This certain induction period is particularly desirable if the polymerization is to be carried out as a continuous process.

The exposure time of thin layer of resin on the surface of clear window are kept below induction period, thin layer of resin will stay as liquid so as to allow the continuous light irradiation and build up objects above this thin layer of liquid. This transit light exposed thin layer of liquid resin was continuously replaced with fresh resin. Specially designed mechanical arm has sharp edge, which can cut through liquid resin easily and move liquid resin underneath of sharp edge while supplies resin and minimizes the disturbing of the liquid resin above mechanical arm, which can be polymerized to form desired objects. Other mechanisms may also be used to achieve the same result, such as other mechanical means, pump system, circulation system, pressure system, vacuum system, suction system, channel system, etc. The resin has transit exposure to light below induction period can be quenched quickly by inhibitor existed in resin and printer system.

In the case of using DLP method, it builds 3D objects by projecting sequential voxel planes into liquid resin (or heated resin), which then polymerizes it to solid with a thin layer of liquid resin between cured solid and clear window or silicone releasing film or other coated clear window. The formation of this thin layer of liquid resin is due to the induction period required for this thin layer to be cured and rapidly exchange liquid resins in this thin layer area with those liquid resins unexposed to light irradiation, which limits their exposure to light irradiation below induction period so as to remain as liquid resins. The arm(s) also is used for the supply of additional liquid resin for continuous polymerization. Many different types of mechanical arm designs can be used, such as stainless steel arm, plastic arm, ceramic arm, Teflon, silicone or other material coated arm. These specially designed mechanical arms are very thin and have sharp edge to cut through liquid resin and move liquid resin around or around and below quickly with minimal drag. The relatively stand still resin can be cured quickly to form shape stable and accurate object. In addition, a physical constraint form may be used intimately above moveable mechanical arm(s). This physical constraint form may be in a shape of tube, ring, diamond ring, half-moon ring, half cycle ring, elliptical ring, square ring, rectangle ring, etc. according to the need of printed objects and the shape of building platform. This constraint form can be in any shape based on the need of printed objects and corresponding building platforms, which can minimize the drag of 3D printing materials right above moveable mechanical arm(s). These mechanical arms may be used individually and multiply at the same time, which are able to effectively move thin layer of liquid resin rapidly. The mechanical arms can be single, double, or multiple with various thickness and various wideness and move in different ways (such as different directions, different speeds, etc.) depends on the need, build volume, speed or resin system. There is no need to separate the cured solid from the clear window of vat and continuous polymerization is possible due to a thin layer of liquid existed between clear window and cured objects, which significantly speeds up the fabrication process. This thin layer of uncured liquid will be continuously changed or replaced to remain un-polymerized and maintain a liquid resin zone. In addition, an inhibited coated layer on the clear window may also be used so as to impart the inhibiting effects so as to better maintain a thin layer of liquid resin on top of clear window for easy releasing and rapid polymerization to quickly build up 3D objects. An easy replace film system or design may be used to facilitate the replacement of the inhibited coated layer on the clear window. An automated system may also be used to apply continuously the fresh inhibited coated layer so as to maintain the efficient releasing/inhibiting properties. Successive layers of polymerized material are quickly and continuously added in this manner until the device is completely fabricated. Then 3D object, for example, a denture, is washed, finished and fully final cured as needed. A heated vat may be used, which will offer better polymerization conversion and a post cure may not be needed when a heated vat is used. The fully cured object, such as a cured and polished denture is now ready to be used by the patient.

Printable Polymerizable Materials

A printable polymerizable material is used to make the dental products in accordance with the methods of this invention. By the term, "printable" as used herein, it is meant a material which is flowable (fluid) at a temperature below ambient temperature, at ambient temperature and above ambient temperature.

Flowable material having a flowable temperature in the range of −30° C. to 140° C. The following components can be used to prepare the printable polymerizable material in accordance with this invention.

Systems and Methods

3D Printing Using DLP System and 3D Printing Using Stereolithography

In general, many 3D printing systems, including these two approaches (DLP printer or Stereolithography printer) can be used for fabricating the three-dimensional object using the CMSL and fast printing systems of this invention.

Following each of these approaches, the printable polymerizable material is flowable or heated to form a flowable liquid. In contrast to conventional DLP or SLA printer, 3D printer of this invention allows rapidly and continuously build successive layers of the polymerizable material by projecting or irradiating light onto the building plane and cures to form the 3D object, denture or other dental device and builds up continuously with objects rising up with building table rapidly and easily since a thin layer of liquid resin is maintained between cured object and clear window or coated clear window. Optional, inhibitors containing coating may be used to further inhibit any curing on the clear window. Inhibitors used in thin coating maintain the inhibiting effects so as to prevent the polymerization of liquid resin on clear window. The resulting 3D object, denture, aligner, splint, crown, bridge or other dental device should exhibit excellent mechanical and physical properties, shade and color properties.

Also, as described in the following examples, various formulations of the printable polymerizable materials can be prepared for use in a printing device. It is important that the formulations have sufficient low viscosity so that they can be handled and cured device can be removed easily from the liquid resin vat (bath). At the same time, the formulations must be capable of producing various 3D objects, specifically, dental products having sufficient mechanical strength and integrity. This invention provides surprisingly high strength and surprisingly tough materials for various applications. It also provides high strength and tough, biocompatible dental materials for various dental applications. Several flowable, printable polymerizable materials were prepared with various shades for different applications. The flowable, printable polymerizable materials were successfully, locally cured to form various 3D objects. Several selected examples are shown in the Example Section. The materials of this invention were cured in this manner layer by layer in this special designed 3D printer and formed 3D objects including 3D dental objects that can be easily separated from the rest of liquid resin in the vat of 3D printer. Additionally, wash solvents (e.g., ethyl acetate, alcohols, acetone, THF, heptane, etc. or their combinations) may be used to remove uncured resin from 3D dental objects. Final cure or heat treatment may be used to enhance their mechanical and physical properties as well as their performance. Air barrier coating or sealer may be used prior to final cure. Inert atmosphere may be used for final cure dental devices or mass production of dental devices (e.g., denture teeth, denture bases, crowns, bridges) in a manufacturing environment.

Alternatively, the continuous moving surface liquid resin system (CMSL) and fast printing systems of this invention can be used by other means to build 3D objects. This CMSL system is especially beneficial to use materials having shear thinning or thixotropic behaviors. The use of shear thinning materials allows the surface layer on the window flow easily under the shear strain of mechanical arm(s), while the material above the arm(s) remains in position. Additional physical constraint is applied to further prevent the materials above mechanical arm from moving. This physical constraint is especially useful for the 3D printing of crown and bridge. The space between the window and physical constraint should be just sufficient for the mechanical arm(s) freely move in between. This invention can be used in other industries, such as aerospace, animation and entertainment, architecture and art, automotive, consumer goods and packaging, education, electronics, hearing aids, sporting goods, jewelry, medical, manufacturing, etc.

EXAMPLES

Example 1

Preparation of Oligomer

A reactor was charged with 1176 grams of trimethyl-1,6-diisocyanatohexane (5.59 moles) and 1064 grams of bisphenol A propoxylate (3.09 moles) under dry nitrogen flow and heated to about 65° C. under positive nitrogen pressure. To this reaction mixture, 10 drops of catalyst dibutyltin dilaurate were added. The temperature of the reaction mixture was maintained between 65° C. and 140° C. for about 70 minutes and followed by additional 10 drops of catalyst dibutyltin dilaurate. A viscous paste-like isocyanate end-capped intermediate product was formed and stirred for 100 minutes. To this intermediate product, 662 grams (5.09 moles) of 2-hydroxyethyl methacrylate and 7.0 grams of BHT as an inhibitor were added over a period of 70 minutes while the reaction temperature was maintained between 68° C. and 90° C. After about five hours stirring under 70° C., the heat was turned off, and oligomer was collected from the reactor as semi-translucent flexible solid and stored in a dry atmosphere.

Example 2

Preparation of Urethane Monomer (UCDPMAA)

A 500 mL flask was charged with 38.8 grams (0.200 moles) of 1,3-bis(isocyanatomethyl)cyclohexane under dry nitrogen flow and heated to about 60° C. under positive nitrogen pressure. To this reaction mixture, 3 drops of catalyst dibutyltin dilaurate were added. A mixture of 22.7 grams of 2-hydroxy-3-phenoxy propyl acrylate, 26.6 grams (0.204 mole) of 2-hydroxyethyl methacrylate, 11.5 grams (0.099 mole) of 2-hydroxyethyl acrylate and 0.10 grams of BHT as an inhibitor were added over a period of 70 minutes while the reaction temperature was maintained between 56° C. and 78° C. After about four hours stirring, the heat was turned off, and monomer was collected from the flask as viscous liquid and stored in a dry atmosphere.

Printable Polymerizable Compositions

Printable polymerizable compositions are used in a 3D building resin vat/bath of specifically designed/modified 3D printer to fabricate the objects including dental objects. These compositions may contain acrylate or methacrylate monomers or oligomers, polymers, fillers, pigments, stabilizers and light curable initiators, etc. Preferably, these resins will form flowable liquids at ambient or elevated temperatures and cure rapidly at those temperatures required for different resins to form 3D objects layer-wise. This results in the formation of shape-stable three-dimensional objects.

Example 3

Dental Materials

A polymerizable dental material was prepared by stirring at ambient temperature a liquid mixture of 32 grams of oligomer made following the procedure of Example 1; 20 grams of oligomer made following the procedure of Example 2 (UCDPMAA); 40 grams of ethoxylated bisphenol dimethacrylate (SR480, sold by Sartomer, Exton, Pa.); 6.0 grams of Clearstrength C320 (sold by Arkema); 1.0 gram of 2,4,6-trimethylbenzoyldiphenylphosphine oxide (Lucirin TPO available from BASF); and 1.0 gram of visible light initiating solution (e.g., about 0.05 to about 10, preferably from about 0.1 to about 5% by wt. the dental material) containing 5-20% (e.g., about 13.3%) camphorquinone (CQ), 10-35% (e.g., about 23.0%) methacrylic acid (MAA), 0.05-5% (e.g., about 1.3%) butylated hydroxytoluene (BHT), 30-60% (e.g., about 46%) N,N-dimethylaminoethylneopentyl acrylate, and 5-30% (e.g., about 16.3%) γ-methacryloxypropyltrimethoxysilane.

Example 4

Dental Materials

A polymerizable dental material was prepared by stirring at ambient temperature a liquid mixture of 350 grams of oligomer made following the procedure of Example 1; 100 grams of tris(2-hydroxy ethyl) isocyanurate triacrylate (SR368, sold by Sartomer); 445 grams of methyl methacrylate (MMA, sold by Evonik); 75 grams of rubber impact modifier S2006 (from Mitsubishi Rayon Co.); 20 gram of 2,4,6-trimethylbenzoyldiphenylphosphine oxide (Lucirin TPO available from BASF); and 10 gram of visible light initiating solution (e.g., about 0.05 to about 10, preferably from about 0.1 to about 5% by wt. the dental material) containing 5-20% (e.g., about 13.3%) camphorquinone (CQ), 10-35% (e.g., about 23.0%) methacrylic acid (MAA), 0.05-5% (e.g., about 1.3%) butylated hydroxytoluene (BHT), 30-60% (e.g., about 46%) N, N-dimethylaminoethylneopentyl acrylate, and 5-30% (e.g., about 16.3%) γ-methacryloxypropyltrimethoxysilane.

Example 5

Dental Materials

A polymerizable dental material was prepared by stirring at ambient temperature a liquid mixture of 96 grams of oligomer made following the procedure of Example 1; 60 grams of butyl diglycol methacrylate (Visiomer® BDGMA, sold by Evonik); 90 grams of methyl methacrylate (MMA, sold by Evonik); 18 grams of rubber impact modifier Clearstrength C320 (sold by Arkema); 5.4 grams of 2,4,6-trimethylbenzoyldiphenylphosphine oxide (Lucirin TPO available from BASF); and 0.6 gram of butylated hydroxytoluene (BHT).

Example 6

Dental Materials

A polymerizable dental material was prepared by stirring at ambient temperature a liquid mixture of 68 grams of oligomer made following the procedure of Example 1; 20 grams of 2-phenoxyethyl acrylate (SR339, sold by Sartomer, Exton, Pa.); 10 grams of rubber impact modifier Clearstrength C320 (sold by Arkema); 1.8 grams of 2,4,6-trimethylbenzoyldiphenylphosphine oxide (Lucirin TPO available from BASF); and 0.2 gram of butylated hydroxytoluene (BHT).

Example 7

Dental Materials

A polymerizable dental material was prepared by stirring at ambient temperature a liquid mixture of 68 grams of oligomer made following the procedure of Example 1; 20 grams of 2-phenoxyethyl acrylate (SR339, sold by Sartomer, Exton, Pa.); 10 grams of rubber impact modifier Genioperl P52 (sold by Wacker); 1.8 grams of 2,4,6-trimethylbenzoyldiphenylphosphine oxide (Lucirin TPO available from BASF); and 0.2 gram of butylated hydroxytoluene (BHT).

Example 8A

Dental Materials

A polymerizable dental material was prepared by stirring at ambient temperature a liquid mixture of 32 grams of oligomer made following the procedure of Example 1; 40 grams of ethoxylated bisphenol dimethacrylate (SR480, sold by Sartomer, Exton, Pa.); 20 grams of 3,3,5-trimethylcyclohexyl methacrylate (CD421A, sold by Sartomer, Exton, Pa.); 6 grams of rubber impact modifier Clearstrength C320 (sold by Arkema); 1.8 grams of 2,4,6-trimethylbenzoyldiphenylphosphine oxide (Lucirin TPO available from BASF); and 0.2 gram of butylated hydroxytoluene (BHT).

Example 8B

Dental Materials

A polymerizable dental material was prepared by stirring at ambient temperature a liquid mixture of 34 grams of oligomer made following the procedure of Example 1; 30 grams of 2-phenoxyethyl methacrylate (SR340, sold by Sartomer, Exton, Pa.); 21 grams of ethoxylated bisphenol dimethacrylate (SR480, sold by Sartomer, Exton, Pa.); 7 grams of ethoxylated bisphenol dimethacrylate (SR348, sold by Sartomer, Exton, Pa.); 6 grams of rubber impact modifier M731 (sold by Kaneka); 1.8 grams of 2,4,6-trimethylbenzoyldiphenylphosphine oxide (Lucirin TPO available from BASF); and 0.2 gram of butylated hydroxytoluene (BHT).

Example 8C

Dental Materials

A polymerizable dental material was prepared by stirring at ambient temperature a liquid mixture of 30 grams of oligomer made following the procedure of Example 1; 30 grams of methyl methacrylate (MMA); 30 grams of ethoxylated bisphenol dimethacrylate (SR480, sold by Sartomer, Exton, Pa.); 8 grams of rubber impact modifier M731 (sold by Kaneka); 1.9 grams of 2,4,6-trimethylbenzoyldiphenylphosphine oxide (Lucirin TPO available from BASF); and 0.1 gram of butylated hydroxytoluene (BHT).

Example 8D

Dental Materials

A polymerizable dental material was prepared by mixing and degassing at elevated temperature a liquid mixture of 25 grams of oligomer made following the procedure of Example 2; 10 grams of ethoxylated bisphenol dimethacrylate (SR480, sold by Sartomer, Exton, Pa.); 14 grams of 1, 12-dodecanediol dimethacrylate; 50 grams of silanated barium aluminoflurosilicate glass (BAFG) having an average particle size of from about 0.01 to about 10 micrometers; 0.975 grams of 2,4,6-trimethylbenzoyldiphenylphosphine oxide (Lucirin TPO available from BASF); and 0.025 gram of butylated hydroxytoluene (BHT).

Example 8E

Dental Materials

A polymerizable dental material was prepared by mixing and degassing at elevated temperature a mixture of 154.4 grams of oligomer made following the procedure of Example 2; 53.3 grams of Tris(2-hydroxy ethyl) isocyanurate triacrylate (SR368, sold by Sartomer, Exton, Pa.); 39.6 grams of TEGDMA (triethyleneglycol dimethacrylate); 750 grams of silanated barium aluminoflurosilicate glass (BAFG) having an average particle size of from about 0.2 to about 5 micrometers and pigments; and 2.7 grams of 2,4,6-trimethylbenzoyldiphenylphosphine oxide (Lucirin TPO available from BASF).

3D Printing With Continuous Moving Surface Liquid Resin System (CMSL)

The liquid resin that is continuous moving out of curing zone is unable to polymerization due to exposure time below the induction period. Once liquid resin is irradiated above its induction period, it will polymerize quickly to form shape stable layer on building platform and build up layer by layer to form desired object. A constant moving liquid layer between building platform and clear window allows the continuous build-up of the object rapidly. This liquid layer between printed object and clear window on the bottom of vat can also facilitate the releasing of printed object in the vat.

Example 9

Fabrication of Object

A transparent heated container (vat) loaded with liquid resin of Example 6 was placed on top of a handheld light QHL75 (sold by Dentsply). A specially designed scraper with razor blade was placed into this container, which swept through the bottom of transparent container rapidly and repeatedly. One minute later, a cured thin cycle (the shape of light projection from handheld light) was formed in the middle of container with liquid resin below and above. Two minutes later, a cured cycle with increased thickness was formed in the middle of container with liquid resin below and above.

Example 10

Fabrication of Object

A transparent container (vat) loaded with liquid resin of Example 8 was placed on top of a handheld light QHL75 (sold by Dentsply). A small build platform was placed into this container and set right on top of the handheld light guide. A specially designed scraper with razor blade was placed into this container underneath the build platform, which swept through the bottom of transparent container underneath build platform rapidly and repeatedly. One minute later, a cured thin cycle (the shape of light projection from handheld light) was formed on the build platform, which was slowly moved up. Two minutes later, a cured cycle with increased thickness due to continuously build platform moved up, was formed on the build platform with liquid resin and scraper below. Five minutes later, a cured rod was obtained on build platform with liquid resin and scraper below that are between clear bottom of vat and cured rod. This experiment was repeated and gave the similar results. When any residue liquid resin in vat was not scraped cleanly, a thin cured layer formed on the bottom of vat but a thin liquid resin layer remained between thin cured and rod on the build platform due to the constant moving and replacing. So it is important to scrape the surface of vat cleanly and an inhibited surface of vat also prevented the formation of thin cured layer on the clear window of vat.

Example 11

Fabrication of Object

A transparent container (vat) loaded with liquid resin of Example 5 was loaded into 3D printer (B9Creator) and sequential voxel planes are projected into the liquid resin in a layer-wise manner as controlled by a computer to form 3D object. A specially designed thin scraper with razor blade was placed into this container underneath the build platform, which swept through the bottom of clear window underneath build platform rapidly and repeatedly whenever Projector was projecting on the clear window. In this way, a cured object was obtained on build platform with liquid resin and scraper below that are between clear window of vat and cured object. This enables the continuous build up an object.

Example 12

Fabrication of Object

A container (vat) loaded with liquid resin of Example 8C was loaded into a 3D printer equipped with a DLP projector and sequential voxel planes are projected into the liquid composite resin in a layer-wise manner as controlled by a computer to form 3D object. A specially designed thin mechanical arm was placed into this container underneath the build platform enclosed with a border, which swept through the bottom of clear plastic window intimately between plastic window and build platform border rapidly and repeatedly while the DLP Projector was projecting on the clear window. Build platform is able to freely move up and down inside a static build platform border that is right above thin mechanical arm, which restricts the resin movement somewhat. In this way, a cured object (a rod) was obtained on build platform with liquid resin and thin mechanical arm below that are between clear window of vat and cured object. This enables the continuous build up an object.

Example 13

Fabrication of Object

A container (vat) loaded with liquid composite resin of Example 8D was loaded into a 3D printer equipped with a DLP projector and sequential voxel planes are projected into the liquid composite resin in a layer-wise manner as controlled by a computer to form 3D object. A specially designed thin wire was placed into this container underneath the small build platform (12 mm in diameter) inside a small tube (14 mm in diameter), which swept through the bottom of clear plastic window intimately between plastic window and small tube rapidly and repeatedly while the DLP Projector was projecting on the clear window. In this way, cured objects (a rod and a tube form) were obtained on build platform with liquid resin and thin wire below that are between clear window of vat and cured object. This enables the continuous build up an object.

Example 14

Fabrication of Object

A container (vat) equipped with a heater was loaded with liquid composite resin of Example 8E and placed into a 3D printer equipped with a DLP projector and sequential voxel planes are projected into the heated liquid composite resin in a layer-wise manner as controlled by a computer to form 3D object. A specially designed thin mechanical arm was placed into this container underneath the small build platform (12 mm in diameter) inside a small tube (14 mm in diameter), which swept through the bottom of clear plastic window intimately between plastic window and small tube rapidly and repeatedly while the DLP Projector was projecting on the clear window. In this way, a cured object (a rod) was obtained on build platform with liquid resin and thin mechanical arm below that are between clear window of vat and cured object. This enables the continuous build up an object.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

The invention claimed is:

1. A method for making a three-dimensional object comprising the steps of
   a. loading a polymerizable liquid resin material or heated resin material as a liquid into a resin bath (vat) of a 3D printer;
   b. positioning one or more mechanical arms on top of a clear and/or transparent window proximate to a bottom surface of the resin bath to maintain a liquid interface between a build surface and the clear and/or transparent window proximate to the bottom of the resin bath; wherein the one or more mechanical arms include an edge that is in contact with the clear and/or transparent window;
   c. applying sequential voxel planes into the liquid resin or the heated resin to form a first layer of material, which polymerizes into a first solid layer;
   d. moving the one or more mechanical arms at a speed so that the edge removes at least a portion of the liquid resin or heated resin from pre-matured polymerization while separating and removing a portion of the first solid layer from the clear and/or transparent window using the edge of the one or more mechanical arms to clean the clear and/or transparent window;
   e. supplying additional liquid resin or heated resin to the cleaned clear and/or transparent window;
   f. applying sequential voxel planes into the additional liquid resin or the heated resin to form a second layer of material, which polymerizes into a second solid layer;
   g. adjusting the speed of the one or more arms based on curing rate, curing area, curing volume, moving of building platform, and/or rheological behavior of the polymerizable liquid resin material or heated resin material so that the edge separates and removes a portion of the additional liquid resin or heated resin and a portion of the second solid layer from the clear and/or transparent window; and
   h. applying one or more successive layers of the polymerized material continuously until a predetermined shape is formed.

2. The method of claim 1, wherein the applying steps are accomplished by a 3D printer selected from the group consisting of a DLP based, stereolithography based and other light irradiation based 3D printer.

3. The method of claim 1, wherein the one or more mechanical arms are in a form selected from the group consisting of a thin wire, a thin knife, a thin disk, a thin half circle wire, and any combinations thereof.

4. The method of claim 1, wherein the one or more mechanical arms are continuously moving during printing to maintain a thin liquid layer at ambient or elevated temperature on the clear and/or transparent window at the bottom of the resin bath.

5. The method of claim 4, wherein the thin liquid layer has a thickness of from about 0.02 mm to about 2 mm.

6. The method of claim 1, wherein the one or more mechanical arms have different cross-section shapes selected from the group consisting of a circle, triangle, square, wedge, rectangle, elliptical, diamond, and any combinations thereof.

7. The method of claim 1, wherein the one or more mechanical arms enable the continuous flow of highly viscous materials on the clear and/or transparent window at the bottom of the resin bath.

8. The method of claim 1, wherein a shear strain from the one or more mechanical arms form a thin layer of flowable material at the bottom of the resin bath.

9. The method of claim 1, wherein the one or more mechanical arms is at least two mechanical arms.

10. The method of claim 1, further comprising the step of utilizing a physical constraint form intimately above the one or more moveable mechanical arms, wherein the physical constraint form is in a shape selected from the group consisting of a tube, a ring, a diamond ring, a half-moon ring, a half cycle ring, an elliptical ring, a square ring, a rectangle ring and a combination thereof according to the predetermined need of the printed object and a shape of a building platform.

11. The method of claim 1, wherein the three-dimensional object is a dental prosthesis or dental device, selected from the group consisting of an artificial tooth, a denture, an orthodontic appliance, an aligner, a splint, a veneer, an inlay, an onlay, a coping, a frame pattern, a crown and a bridge.

12. The method of claim 1, wherein the liquid resin material or the heated resin material comprises at least a polymerizable material and polymerization initiation system capable of being activated by light.

13. The method of claim 1, wherein the resin material is heated to have a reduced viscosity or to achieve a sufficient flowable state.

14. The method of claim 12, wherein the polymerizable material comprises at least one of polymerizable acrylic oligomers, one or more prepolymers and one or more monomers.

15. The method of claim 12, wherein the polymerizable material further comprises a particulate filler.

16. The method of claim 15, wherein the particulate filler is selected from the group consisting of silica, alumina, silicon nitride, polymers, inorganic articulates, glasses and any combinations thereof.

17. The method of claim 12, wherein the polymerization initiation system comprises a photoactive agent, selected from the group consisting of camphorquinone, 2,4,6 trimethylbenzoyldiphenyl phosphine oxide, and any combination thereof.

18. The method of claim 12, wherein the polymerizable material further comprises one or more pigments.

19. The method of claim 12, wherein the polymerizable material further comprises one or more inhibitors.

\* \* \* \* \*